(12) United States Patent
Capobianco et al.

(10) Patent No.: US 7,618,487 B2
(45) Date of Patent: Nov. 17, 2009

(54) FLUORSPAR-BASED FILLER AND METHOD FOR MAKING THE SAME

(75) Inventors: Chris Capobianco, Asheville, NC (US); Scott VanRemortel, Mars Hill, NC (US); Thomas A. Gallo, Asheville, NC (US)

(73) Assignee: Unimin Corporation, New Canaan, CT (US)

( * ) Notice: Subject to any disclaimer, the term of this patent is extended or adjusted under 35 U.S.C. 154(b) by 0 days.

(21) Appl. No.: 12/125,594

(22) Filed: May 22, 2008

(65) Prior Publication Data

US 2008/0216713 A1 Sep. 11, 2008

Related U.S. Application Data

(60) Division of application No. 11/523,058, filed on Sep. 15, 2006, now Pat. No. 7,498,377, which is a continuation-in-part of application No. 11/256,839, filed on Oct. 24, 2005.

(51) Int. Cl.
- C04B 14/04 (2006.01)
- B32B 5/16 (2006.01)
- B60C 1/00 (2006.01)
- C08K 3/34 (2006.01)
- C01D 3/02 (2006.01)
- C01F 5/28 (2006.01)

(52) U.S. Cl. .................. 106/481; 428/403; 428/404; 524/492; 423/490

(58) Field of Classification Search ............ 524/431; 106/479, 466, 481; 428/403
See application file for complete search history.

(56) References Cited

U.S. PATENT DOCUMENTS

| | | | |
|---|---|---|---|
| 4,053,302 A | 10/1977 | Nafziger et al. | |
| 4,243,417 A | 1/1981 | Grourke et al. | |
| 5,908,879 A | 6/1999 | Kawashima | |
| 6,136,085 A | 10/2000 | Adams | |
| 6,218,012 B1 * | 4/2001 | Rota et al. | 428/402 |
| 6,531,223 B1 * | 3/2003 | Rota et al. | 428/402 |
| 6,613,230 B2 | 9/2003 | Krulik | |
| 6,881,782 B2 | 4/2005 | Crater et al. | |
| 2002/0013401 A1 * | 1/2002 | Friel et al. | 524/501 |
| 2002/0016405 A1 * | 2/2002 | Friel et al. | 524/501 |
| 2002/0056402 A1 | 5/2002 | Seeger | |
| 2005/0067151 A1 | 3/2005 | Miller | |
| 2006/0046099 A1 | 3/2006 | Maier | |

OTHER PUBLICATIONS

UCAR Latex 379G—The Best Just Got Better—Union Carbide.

* cited by examiner

*Primary Examiner*—Mark Eashoo
*Assistant Examiner*—Angela C Scott
(74) *Attorney, Agent, or Firm*—Fay Sharpe LLP; Brian E. Turung (57) ABSTRACT

A filler material that includes a metal fluoride compound which is coated with silica. The filler material can be used in various types of covering agents.

21 Claims, 1 Drawing Sheet

FIG. 1

FLUORSPAR-BASED FILLER AND METHOD FOR MAKING THE SAME

The present invention is a divisional of U.S. patent application Ser. No. 11/523,058 filed Sep. 15, 2006 now U.S. Pat. No. 7,498,377, which in turn is a continuation-in-part of U.S. patent application Ser. No. 11/256,839 filed Oct. 24, 2005, which is incorporated herein by reference.

The present invention relates to filler materials, and particularly to a fluoride-based filler that can be used in a variety of applications such as, but not limited to, paint fillers.

BACKGROUND OF THE INVENTION

Filling materials are typically lower cost components that are used to provide bulk to various types of components and/or enhance or extend function of one or more other components in a product. For example, paints typically include a pigment composition to achieve the desired color and hiding power of the paint. Many interior and exterior paints include hiding white-pigments. Other tints and colors can be mixed with the white pigments to obtain various colored paints. The pigments used in the paint can include inorganic and organic pigments, pigment lakes, insoluble dyes and other durable coloring matter. While the pigmentation of the paint can be solely from prime pigments, it is economically impractical to use solely prime pigments at the indicated high pigment volume concentration. As such, it is common that the pigment in the paint includes a hiding prime pigment and a pigment extender. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration.

Common pigment extenders that are used in paints include calcium carbonate, gilders whiting talc, barytes, magnesium silicates, aluminum silicates, diatomaceous earth, china clay, asbestine, silica and mica. The need for improved extenders and/or fillers for products continues to exist. The present invention is directed to a material and a method and a manufacturing process for making the such material that can be used as a filler in a variety of products and/or as a pigment extender in paints, stains, varnishes, primer, lacquers, sealants, etc.

SUMMARY OF THE INVENTION

The present invention is directed to a novel filler material and a method and process for manufacturing such novel filler material. The filler can be used as the sole filler or in combination one or more other types of fillers. Also, when the filler material is at least partially used a pigment extender, the filler material can be the sole pigment extender or be used in combination with one or more other pigment extenders. The filler material of the present invention can be used to reduce the amount of silica that is included in a particular type of product and/or to reduce the raw material cost of a particular product. In some applications, the filler material of the present invention can enhance one or more properties of a product (e.g., increasing the hiding power of paint, increased matting of paint, improved scrub and brush resistance of paint, increase the contract ratio of paint, lower the sheen of the paint, etc.).

In one non-limiting aspect of the present invention, the novel filler material of the present invention is a metal fluoride compound is coated with silica (e.g., amorphous silica, etc.). In one non-limiting embodiment of the invention, the metal fluoride compound includes calcium fluoride; however, it can be appreciated that other or additional metal fluoride compounds can be used. In one non-limiting aspect of this embodiment, a majority weight percent of the metal fluoride compound includes calcium fluoride. In another and/or additional non-limiting aspect of this embodiment, at least about 70 weight percent of the metal fluoride compound includes calcium fluoride. In still another and/or additional non-limiting aspect of this embodiment, at least about 80 weight percent of the metal fluoride compound includes calcium fluoride. In yet another and/or additional non-limiting aspect of this embodiment, at least about 90 weight percent of the metal fluoride compound includes calcium fluoride. In still yet another and/or additional non-limiting aspect of this embodiment, at least about 99 weight percent of the metal fluoride compound includes calcium fluoride. In another and/or additional non-limiting aspect of this embodiment, the metal fluoride compound, when including calcium fluoride, can include calcined and/or non-calcined calcium fluoride. In another and/or additional non-limiting embodiment of the invention, the metal fluoride compound content of the filler material is generally about 50-99 weight percent of the novel filler material. In one non-limiting aspect of this embodiment, the metal fluoride compound content of the filler material is generally about 55-90 weight percent of the novel filler material. In still another and/or additional non-limiting aspect of this embodiment, the metal fluoride compound content of the filler material is generally about 60-80 weight percent of the novel filler material. In yet another and/or additional non-limiting aspect of this embodiment, the metal fluoride compound content of the filler material is generally about 60-75 weight percent of the novel filler material. In still yet another and/or additional non-limiting aspect of this embodiment, the metal fluoride compound content of the filler material is generally about 65-75 weight percent of the novel filler material. In yet another and/or additional non-limiting embodiment of the invention, the silica content of the coated metal fluoride is generally about 1-40 weight percent of the novel filler material. In one non-limiting aspect of this embodiment, the silica content of the filler material is generally about 5-35 weight percent of the novel filler material. In another and/or additional non-limiting aspect of this embodiment, the silica content of the filler material is generally about 10-35 weight percent of the novel filler material. In still another and/or additional non-limiting aspect of this embodiment, the silica content of the filler material is generally about 15-30 weight percent of the novel filler material. In yet another and/or additional non-limiting aspect of this embodiment, the silica content of the filler material is generally about 15-25 weight percent of the novel filler material. In still yet another and/or additional non-limiting embodiment of the invention, at least about 1 percent of the outer surface of the metal fluoride compound is coated with the silicon compound. In one non-limiting aspect of this embodiment, at least about 10 percent of the outer surface of the metal fluoride compound is coated with the silicon compound. In another and/or additional non-limiting aspect of this embodiment, at least about 25 percent of the outer surface of the metal fluoride compound is coated with the silicon compound. In still another and/or additional non-limiting aspect of this embodiment, at least about 40 percent of the outer surface of the metal fluoride compound is coated with the silicon compound. In yet another and/or additional non-limiting aspect of this embodiment, at least a majority of the outer surface of the metal fluoride compound is coated with the silicon compound. In still yet another and/or additional non-limiting aspect of this embodiment, at least about 80 percent of the outer surface of the metal fluoride compound is coated with the silicon compound.

In another and/or alternative non-limiting aspect of the present invention, the average particle size of the novel filler material of the present invention is generally no greater than about 100 microns. In one non-limiting aspect of this embodiment, the average particle size of the novel filler material of the present invention is generally no greater than about 80 microns. In another and/or additional non-limiting aspect of this embodiment, the average particle size of the novel filler material of the present invention is generally about 1-60 microns. In still another and/or additional non-limiting aspect of this embodiment, the average particle size of the novel filler material of the present invention is generally about 2-40 microns. In yet another and/or additional non-limiting aspect of this embodiment, the average particle size of the novel filler material of the present invention is generally about 5-30 microns. In still yet another and/or additional non-limiting aspect of this embodiment, the average particle size of the novel filler material of the present invention is generally about 8-20 microns. As can be appreciated, larger or smaller particle sizes can be used.

In yet another and/or alternative non-limiting aspect of the present invention, the filler material of the present invention can be formed from precipitation from an aqueous solution containing fluorine containing acid. In one non-limiting embodiment of the present invention, the fluorine containing acid includes hydrofluorosilicic acid; however, other or addition fluorine containing acids can be used. In one non-limiting aspect of this embodiment, at least about 10 weight percent of the fluorine containing acid includes hydrofluorosilicic acid. In another and/or additional non-limiting aspect of this embodiment, at least about 50 weight percent of the fluorine containing acid includes hydrofluorosilicic acid. In still another and/or additional non-limiting aspect of this embodiment, at least about 75 weight percent of the fluorine containing acid includes hydrofluorosilicic acid. In yet another and/or additional non-limiting aspect of this embodiment, at about 80-100 weight percent of the fluorine containing acid includes hydrofluorosilicic acid. In another and/or additional non-limiting embodiment of the present invention, one or more other acids can be included with the fluorine containing acid (e.g., hydrochloric acid, etc.); however, this is not required. In yet another and/or additional non-limiting embodiment of the present invention, the source of fluorine containing acid can be from a waste stream from another chemical process; however, this is not required. The concentration of the fluorine containing acid varies depending on the source of the fluorine containing acid. For instance, if the primary source of fluorine containing acid is from a waste stream of another chemical process, the concentration of the fluorine containing acid is typically low. In one non-limiting example, the concentration of the fluorine containing acid in a waste stream used to form the filler material of the present invention is about 0.05-5% acid. In another non-limiting example, the concentration of the fluorine containing acid in a waste stream used to form the filler material of the present invention is about 0.1-2% acid. In still another non-limiting example, the concentration of the fluorine containing acid in a waste stream used to form the filler material of the present invention is about 0.2-1% acid. As can be appreciated, the concentration of the fluorine containing acid can be higher in some waste streams and/or when the fluorine containing acid is from a source other than a waste stream.

In still yet another and/or alternative non-limiting aspect of the present invention, the filler material of the present invention can be formed from precipitation from an aqueous solution containing fluorine containing acid in one or more stages. In one non-limiting embodiment of the invention, at least one reactor tank or vessel is used to at least partially form the filler material. In one aspect of this embodiment, the source of aqueous solution containing fluorine containing acid is fed directly into a reactor tank or vessel. The source of aqueous solution containing fluorine containing acid that is fed into the reactor tank or vessel can 1) come directly from a waste stream, 2) come from a storage tank that contains a source of fluorine containing acid, etc. In one non-limiting arrangement, the source of fluorine containing acid that is fed into a reactor tank or vessel is at least partially from a storage tank. The storage tank can be designed to supply a steady or continues supply of the fluorine containing acid to the reactor tank or vessel. The storage tank can be at least partially supplied with fluorine containing acid from a waste stream that includes fluorine containing acid and/or can be at least partially supplied from another source of fluorine containing acid.

In another and/or alternative non-limiting aspect of the present invention, a source of calcium is added to one or more of the reactor tanks or vessels to be at least partially reacted with the source of fluorine containing acid. In one non-limiting embodiment of the invention, the source of calcium includes calcium oxide and/or calcium hydroxide. One non-limiting aspect of this embodiment, the calcium oxide source is lime and/or hydrated lime; however, other or additional calcium oxide sources can be used. In another and/or additional non-limiting aspect of this embodiment, the source of calcium includes a majority weight percent calcium oxide. In another and/or additional non-limiting aspect of this embodiment, the source of calcium includes about 80-100 weight percent calcium oxide. In yet another and/or additional non-limiting aspect of this embodiment, the source of calcium includes about 80-100 weight percent lime and/or hydrated lime. In another and/or additional non-limiting embodiment of the invention, the source of calcium has an average particle size of no greater than about 100 microns. In one non-limiting aspect of this embodiment, the source of calcium has an average particle size of about 1-60 microns. In another and/or additional non-limiting aspect of this embodiment, the source of calcium has an average particle size of about 2-40 microns.

In still another and/or alternative non-limiting aspect of the present invention, a sufficient amount of a calcium source is added to one or more of the reactor tanks or vessels to cause the pH in the first reactor tank or vessel to increase. Typically the pH of the acid stream that includes a source of fluorine containing acid is less than about 4, and typically less than about 3, and more typically about 2 or less. A sufficient amount of a calcium source is added to the source of fluorine containing acid to cause the pH of the mixture to increase at least about 0.25 pH, typically at least about 0.5 pH, and more typically at least about 1 pH. As can be appreciated, sufficient amounts of a calcium source can be added to the reactor tank or vessel in amounts to increase the pH in the first reactor tank or vessel by more than 1 pH. In one non-limiting embodiment of the invention, a sufficient amount of a calcium source is added to the final reactor tank or vessel to cause the pH of the solution in the final reactor tank or vessel to be increased to at least about 5.5 pH, typically at least about 6 pH, and more typically about 6-8 pH; however, a higher pH can be obtained. As can also be appreciated, other or additional materials can be added to the one or more reactor tanks or vessels to increase the pH in the one or more reactor tank and vessel. A pH of greater than about 8 generally is generally sufficient to stop further reaction of the components to form the filler material in the final reactor tank or vessel. When one reactor tank or vessel is used to form the filler material, the pH in the reactor tank is increased over time until the pH is at least about 5.5-6 pH, and more typically about 6-8 pH. When two reactor tanks or vessels are used to form the filler material, the pH in the first reactor vessel is typically increased from about 0.5-4 pH to a pH of about 1.5-5, and the pH is then increased further in the second reactor tank or vessel from about 1-4 pH to about 6-8 pH. As can be appreciated, other pH increases in the two reactor tanks or vessels can be used. When more than two reactor tanks are used to form the filler material, other pH increases in the reactor tanks or vessels can be used.

In yet another and/or alternative non-limiting aspect of the present invention, the source of calcium and a source of fluorine containing acid in the reactor tank or vessel can be agitated to promote a reaction between the two components; however, this is not required. In one non-limiting aspect of the invention, the reactor tank or vessel is agitated by continues or intermediate stirring; however, other or additional types of agitation can be used.

In still yet another and/or alternative non-limiting aspect of the present invention, at least two reactor tanks or vessels are used to at least partially form the filler material. In one non-limiting embodiment of the invention, the source of aqueous solution containing fluorine containing acid and a source of calcium are fed into a first reactor tank or vessel. In the first reactor tank or vessel, at least a portion of the aqueous solution containing fluorine containing acid and a source of calcium react to form the filler material. At least a portion of the formed filler material, at least a portion of the unreacted aqueous solution containing fluorine containing acid is fed into a second reactor tank or vessel. As can be appreciated, any source of calcium that has not reacted in the first reactor tank or vessel may also be fed into the second reactor tank or vessel. In the second reactor tank or vessel, further reaction between the solution containing fluorine containing acid and a source of calcium react to form additional filler material. Additional amounts of a solution containing fluorine containing acid and/or a source of calcium can be added to the second reactor tank or vessel; however, this is not required. In one particular non-limiting arrangement, only a source of calcium is added to the second reactor tank or vessel. The materials in the second reactor tank or vessel can be agitated; however, this is not required. In another and/or additional non-limiting arrangement, overflow from the first reactor tank or vessel is fed into the second reactor tank or vessel. In still another or additional non-limiting arrangement, a sufficient amount of a calcium source is added to the second reactor tank or vessel to cause the pH in the second reactor tank or vessel to increase to about 6-8 pH.

In another and or alternative non-limiting aspect of the present invention, a portion of the content in the first reactor tank is fed back to the storage tank so as to at least partially moderate the pH on the storage tank. In one non-limiting embodiment of the invention, 1-50% of the flow of material from the first reactor tank or vessel is added back to the storage tank. In one aspect of this embodiment of the invention, 5-25% of the flow of material from the first reactor tank or vessel is added back to the storage tank. As can be appreciated, other amounts of material from the first reactor tank or vessel can be added back to the storage tank.

In still another and/or alternative non-limiting aspect of the present invention, the material from one or more of the reactor tanks or vessels is at least partially flocculated with one or more polymers. In one non-limiting embodiment of the present invention, the one or more polymers used for flocculation include an organic polymer. One non-limiting example of a polymer that can be used is Drewfloc 2270 manufactured by Crew Chemical Company. In another and/or additional non-limiting embodiment of the present invention, the one or more polymers for flocculation are added to the filler material after the filler material has exited that last reactor tank or vessel. In still another and/or alternative non-limiting embodiment of the invention, one or more polymers for flocculation are added to the product stream from the last reactor tank or vessel at a rate of at least about 0.01 weight percent based on the solid content of the product stream. In one non-limiting aspect of this embodiment, one or more polymers for flocculation are added to the product stream from the last reactor tank or vessel at a rate of about 0.01-4 weight percent based on the solid content of the product stream. In another and/or alternative one non-limiting aspect of this embodiment, one or more polymers for flocculation are added to the product stream from the last reactor tank or vessel at a rate of about 0.02-1 weight percent based on the solid content of the product stream. In still another and/or alternative one non-limiting aspect of this embodiment, one or more polymers for flocculation are added to the product stream from the last reactor tank or vessel at a rate of about 0.04-0.5 weight percent based on the solid content of the product stream. In yet another and/or alternative one non-limiting aspect of this embodiment, one or more polymers for flocculation are added to the product stream from the last reactor tank or vessel at a rate of about 0.05-0.15 weight percent based on the solid content of the product stream. As can be appreciated, other amounts of polymer for flocculation can be used.

In still another and/or alternative non-limiting aspect of the present invention, the filler material from the last reactor tank or vessel is directed into a slurry thickening vessel to allow the filler material to thicken; however, this is not required. In one non-limiting embodiment of the invention, the solid content of the product stream from the last reactor tank or vessel for forming the filler material is about 1-8 weight percent. The product stream is at least partially directed into a slurry thickening vessel to allow the filler material to settle to the bottom the slurry thickening vessel. The product stream that includes the filler material can include a flocculating agent; however, this is not required. The solid content of the filler material that settles at or near the bottom of the slurry thickening tank is at least about 10 weight percent solids, typically at least about 15 weight percent solids, more typically about 15-40 weight percent solids, and even more typically about 15-20 weight percent solids. The filler material has an average surface area of about 30-150 $m^2/g$.

In yet another and/or alternative non-limiting aspect of the present invention, the thickened slurry from the slurry thickening vessel can be processed to remove oversize particles and/or contaminated particles in the thickened slurry; however, this is not required. In one embodiment of the invention, the thickened slurry from the slurry thickening vessel is at least partially subjected to a hydrocyclone. As can be appreciated, other or additional process can be used to remove liquids, oversize particles and/or contaminated particles in the thickened slurry.

In still yet another and/or alternative non-limiting aspect of the present invention, liquid is removed from the slurry so as to form a drier filler material. In one non-limiting embodiment of the invention, a filter such as, but not limited to, a drum filter, cyclonic filter or the like can be used to remove liquid from the slurry. In another and/or alternative non-limiting embodiment of the invention, a filtercake of filler material is formed from at least a portion of the slurry that has been process by a filter. The filtercake has a solid content of at least about 20 weight percent. In one non-limiting aspect of this embodiment, the solid content of the filtercake is about 25-75 weight percent. In another and/or alternative one non-limiting aspect of this embodiment, the solid content of the filtercake is about 30-50 weight percent. In still another and/or alternative non-limiting embodiment of the invention, liquid is removed from the filler material by use of one or more dryers. Such drier can include, but are not limited to, tubular flash driers, ring flash drier, and the like. In one non-limiting aspect of this embodiment, the filler material is dried by the one or more driers after the filler material has been processed by one or more filters. As can be appreciated, the filler material is not required to be filtered prior to being dried by one or more driers.

In another and/or alternative non-limiting aspect of the present invention, the filler material is collected in a bag or packaging process for final packaging. In one non-limiting embodiment of the invention, the filler material can be screened prior to being bagged or packaged so as to remove undesired sized particles of filler material and/or contaminate. In another and/or alternative non-limiting embodiment of the invention, the filler material is bagged or packaged after the filler material has been filtered and/or dried.

In still yet another and/or alternative non-limiting aspect of the present invention, the filler material of the present invention is used as a component in paint. Such paints can include, but are not limited to, water-based paints, solvent-based paints, etc. In one non-limiting example, the filler material is included in a water-based paint. In one non-limiting aspect of this example, the one or more polymers used in water-based paints can include, but are not limited to, emulsion polymers of vinyl acetate, styrene, styrene-butadiene, vinyl acetate-vinyl chloride, acrylonitrile-butadiene, isoprene, vinylidene chloride-acrylonitrile, vinylidene chloride-vinyl acetate, vinyl chloride-acrylonitrile, acrylic acid ester and methacrylic acid ester polymers and copolymers thereof with other vinyl monomers, carboxylated synthetic and natural rubbers, and so forth. Other useful and well-known water-based paints include the epoxies, alkyds, phthalic alkyds, emulsified drying oils, polystyrene, and the like. In one specific non-limiting example, the water-based paint is a latex paint. One non-limiting example of the latex paint can include vinyl acrylic latex; however, it can be appreciated that many other or additional types of latex paints can be used.

In another aspect of the present invention, a new type of pigment extender that can be used in combination with one or more pigments. The combination of pigment extender and pigment can be used in coating compositions such as paints, stains, varnishes, primer, lacquers, sealants, etc.; however, the pigment extender of the present invention has broader applications that can be used in combination with a pigment in other applications. The pigment extender of the present invention is an improvement of prior extenders such as calcium carbonate, talc, barytes, magnesium silicates, aluminum silicates, diatomaceous earth, china clay, asbestine, barium sulphate, gypsum, silica, talc and mica. These prior extenders were used to increase coverage and reduce the cost of the paint. The pigment extender of the present invention also is formulated to increase coverage and reduce the cost of a covering agent such as paint. The pigment extender of the present invention is also formulated as a full or partial substitute for one or more of the prior extenders. As such, the pigment extender of the present invention can be used as a full or partial substitute of calcined diatomaceous earth thereby reducing the amount of silica that is included in a covering agent such as a paint. The full or partial substitution of calcined diatomaceous earth or another prior extender by the pigment extender of the present invention can also result in a reduction in the cost of raw materials of the covering agent. In many paint formulations, the use of the pigment extender of the present invention can result in an increase in hiding power of the covering agent, increased matting of the covering agent, and/or improved scrub and brush resistance of the covering agent. In some covering agent formulations, the pigment extender of the present invention can fully or partially function as a filler for the covering agent.

In another non-limiting aspect of the present invention, there is provided a pigment extender that includes a combination of nepheline syenite and a metal fluoride compound. The metal fluoride compound has been found to function as a pigment extender (e.g. $TiO_2$ extender, etc.), to increase the contrast ratio of the paint and/or to lower the sheen of the paint. In one non-limiting embodiment, at least a portion of the metal fluoride compound is coated with amorphous silica (e.g., silica coated calcium fluoride, etc.). The average particle size of the coated/non-coated metal fluoride is generally no greater than about 170 mesh; however, larger or smaller particle sizes can be used. The silica content of the coated metal fluoride is generally about 1-40 weight percent; however, other weight percentages can be used. In one non-limiting example, the coated metal fluoride includes about 5-30 weight percent silica and 70-95 weight percent metal fluoride. In another one non-limiting example, the coated metal fluoride includes about 15-25 weight percent silica and 75-85 weight percent metal fluoride. In one non-limiting example, the metal fluoride includes calcium fluoride and has an average particle size of up to about 100 μm. In another non-limiting example, the metal fluoride includes calcium fluoride and has an average particle size of about 3-60 μm. In still another non-limiting example, the metal fluoride includes calcium fluoride and has an average particle size of about 4-40 μm. The metal fluoride when including calcium fluoride can include calcined and/or non-calcined calcium fluoride. In one non-limiting embodiment, the weight ratio of the metal fluoride compound to nepheline syenite is about 0.1-1:1. In another non-limiting embodiment, the weight ratio of the metal fluoride compound to nepheline syenite is about 0.2-0.8:1. In still another non-limiting embodiment, the weight ratio of the metal fluoride compound to nepheline syenite is about 0.3-0.6:1. As can be appreciated, other weight ratios can be used.

In still another and/or alternative non-limiting aspect of the present invention, the pigment that is used in combination with the pigment extender includes white hiding pigments, and/or colored organic and/or inorganic pigments. The pigment is commonly used in covering agents to provide the covering agent with better "hiding power" and/or coverage. Generally the pigment has a refractive index of at least about 1.2, and typically at least about 1.8; however, it can be appreciated that the pigment can have other refractive index values. Non-limiting examples of white pigments can include, but are not limited to, rutile and/or anatase titanium dioxides, basic lead silicate, lithopone, titanate lithopone, titanium-barium pigment, titanium-calcium pigment, titanium-magnesium pigment, zinc sulfide, lead titanate, antimony oxide, zirconium oxide, barium sulfide, white lead, zinc oxide, leaded zinc oxide, and the like, and/or one or more combinations thereof. In one specific non-limiting example, the white pigment includes at least about 20% titanium dioxide. In another specific non-limiting example, the white pigment includes at least about 50% titanium dioxide. When titanium dioxide is included in the hiding pigment, the average particle size of the titanium dioxide is about 0.1-0.5 microns; however, it can be appreciated that larger or smaller particle sizes can be used. The relative proportions of the pigment and the pigment extender may be varied widely, but usually the pigment is present at a concentration that provides the desired paint covering power or hiding, and the extender pigment is present in an amount which provides the paint with the desired total pigment volume concentration. The weight ratio of pigment extender to pigment in the cover agent is generally at least about 0.1, and typically about 0.1-4:1; however, other weight ratios can be used.

In still yet another and/or alternative non-limiting aspect of the present invention, the covering agent includes a thickener. Many covering agents such as paints include thickeners to modify the rheological properties of the paint to ensure good spreading, handling, and/or other or additional application characteristics. In one non-limiting embodiment, the covering agent in the form of a paint includes a thickener such as, but not limited to carboxylated thickeners, urethane associative thickener, polyacrylic acid thickeners, etc.; however, other or additional thickeners can be used in the in the covering agent.

In a further and/or alternative non-limiting aspect of the present invention, the covering agent includes one or more other ingredients such as coalescing solvents (e.g., 2-phenoxyethanol, diethylene glycol butyl ether, dibutyl phthalate, diethylene glycol, 2,2,4-trimethyl-1,1,3-pentanediol monoisobutyrate, etc.), flatting agents (e.g., silica, etc.), plasticizer, anti-foam agent, pH adjuster, tinting color, anti-freeze agent (e.g., ethylene glycol, etc.), surfactant, defoamer, dispersant, anti-foaming agents, water, solvent, odor agents, preservative and/or biocide.

In still a further and/or alternative non-limiting aspect of the present invention, the covering agent can be prepared utilizing conventional techniques. In one non-limiting embodiment, the ingredients of the covering agent can be blended together under high shear to form a mixture commonly referred to as "the grind". The consistency of this mixture is comparable to that of mud so as to efficiently disperse the ingredients with a high shear stirrer. During the preparation of the grind, high shear energy is used to break apart agglomerated particles. The ingredients not included in the grind are commonly referred to as "the letdown." The letdown is usually much less viscous than the grind, and is usually used to dilute the grind to obtain a final covering agent with the proper consistency. The final mixing of the grind with the letdown is typically carried out with low shear mixing; however, this is not required.

It is one non-limiting object of the present invention to provide a silica coated metal fluoride compound and method of making such a compound.

It is another and/or alternative object of the present invention to provide a silica coated metal fluoride compound from a waste steam that includes an acid that contains fluorine.

It is still another and or alternative non-limiting object of the present invention to provide a silica coated metal fluoride compound that can be used as a filler and/or extender in various types of products.

It is yet another and/or alternative non-limiting object of the present invention to provide a silica coated metal fluoride compound that can be used to improve the hiding power of a covering agent such as, but not limited to, paint.

It is still yet another and/or alternative non-limiting object of the present invention to provide a silica coated metal fluoride compound that can be used to improve the matting properties of a covering agent such as, but not limited to, paint.

It is another and/or alternative non-limiting object of the present invention to provide a silica coated metal fluoride compound that can be used to impart chemical resistance to a covering agent such as, but not limited to, paint.

It is still another object of the present invention to provide a new pigment extender that can be used as a partial or full substitute for prior extenders in covering agents.

It is still another and/or alternative non-limiting object of the present invention to provide a new pigment extender that includes a combination of nepheline syenite and a silica coated metal fluoride compound.

It is yet another and/or alternative non-limiting object of the present invention to provide a new pigment extender that can reduce the amount of crystalline silica in a covering agent.

It is still yet another and/or alternative non-limiting object of the present invention to provide a new pigment extender that can reduce the amount of diatomaceous earth in a covering agent.

It is a further and/or alternative non-limiting object of the present invention to provide a new pigment extender can improve the hiding power of a covering agent.

It is still a further and/or alternative non-limiting object of the present invention to provide a new pigment extender that can improve the matting properties of the covering agent.

It is another and/or alternative non-limiting object of the present invention to provide a new pigment extender that can reduce the raw material cost of the covering agent.

These and other objects and advantages will become apparent to those skilled in the art upon the reading and following of this description taken together with the accompanying drawings.

BRIEF DESCRIPTION OF THE DRAWING

Reference may now be made to the drawing, which illustrates one non-limiting embodiment for manufacturing the filler material of the present invention.

DETAILED DESCRIPTION OF THE INVENTION

The present invention is directed to a filler material that can be used in a variety of applications such as, but not limited to, paint fillers. The filler material can be used to improve the properties of a covering agent such as paint. The filler material, when used as a pigment extender in a covering agent, can be used as a partial or full substitute for previously used covering agent fillers such as, but not limited to, calcium carbonate. The filler material can be used to reduce the cost of the raw materials of the covering agent without adversely affecting the properties of the paint. In some covering agent formulations, the filler material of the present invention can be used to increase the hiding power of the covering, reduce the sheen of the covering agent, improve the matting properties of the covering agent, improve the chemical resistance of the covering agent, etc.

The filler material of the present invention is a metal fluoride compound that is coated with silica. In one non-limiting embodiment of the invention, the filler material is a composite powder that includes silica-coated calcium fluoride crystal aggregates, amorphous silica particles, and discrete calcium fluoride crystals that are at least partially produced precipitation from a dilute aqueous solution containing hydrofluorosilicic acid. The metal fluoride compound content of the filler material is about 55-80 weight percent of the filler material, and the silica content is about 10-35 weight percent of the novel filler material. The average particle size of the novel filler material of the present invention is generally no greater than about 100 microns. Typically the average particle size of the novel filler material of the present invention is generally about 5-30 microns. As can be appreciated, larger or smaller particle sizes can be used.

When the filler material is a silica-coated calcium fluoride crystal that is formed by the reaction between calcium fluoride and hydrofluorosilicic acid, the stoichiometry of the reaction is as follows:

$$H_2SiF_6 + 3Ca(OH)_2 = SiO_2 + 3CaF_2 + 4H_2O$$

The theoretical composition of the filler material according to the above reaction is about 20.4 wt % $SiO_2$ and about 79.6 wt % $CaF_2$, based on a completely dry product. The actual composition of the filler material produced by this reaction contains substantial quantities of structural water present primarily in the amorphous silica. Loss on ignition of the filler material can vary from about 1-8 wt %. The hydrous silica phase loses its water gradually between 100° C. and 500° C. The bulk silica content of the filler material can vary from about 15-30 wt %, while $CaF_2$, can vary from about 60-75 wt %. On non-limiting representative example of the filler material formed by the above reaction as identified by quantitative x-ray fluorescence spectrometry (XRF) is as follows:

| | |
|---|---|
| $CaF_2$ | 72.1 |
| $SiO_2$ | 20.9 |
| $Al_2O_3$ | 0.37 |
| Ca(excess) | 1.71 |
| Cl | 0.35 |
| $Fe_2O_3$ | 0.14 |
| MgO | 0.67 |
| $Na_2O$ | 0.51 |
| $SO_3$ | 0.2 |
| LOI | 3.1 |

All analyzed components in the above non-limiting example are in weight percent. All the fluorine is assigned stoichiometrically to Ca, which left an excess of calcium. This excess calcium was assumed to be present in solid solution with the amorphous silica. The LOI (loss on ignition) was measured at 600° C. The particle size analysis for the filler material formed from the above reaction was determined by laser diffraction. The particle size distribution reveals a multimodal distribution of the particles of the filler material due to the various states of aggregation of the primary particles shown in the attached TEM photomicrographs. The primary crystallite size for the $CaF_2$ crystals was determined by the method of x-ray diffraction line broadening as approximately, 50 nanometers and is consistent with the TEM evidence. The measured particle size distribution of the filler material reflects the state of aggregation of the primary particles, which are believed to be held together, in part, by the amorphous silica gel. The mean particle size for the filler material was found to be between about 8-20 microns. One non-limiting particle size distribution is set forth below:

| Mean Size | <10% | <25% | <50% | <75% | <90% | <95% | <99% |
|---|---|---|---|---|---|---|---|
| 15.1 μm | 4.3 μm | 6.0 μm | 11.7 μm | 22.1 μm | 32.4 μm | 43.0 μm | 52.0 μm |

Figure 1:
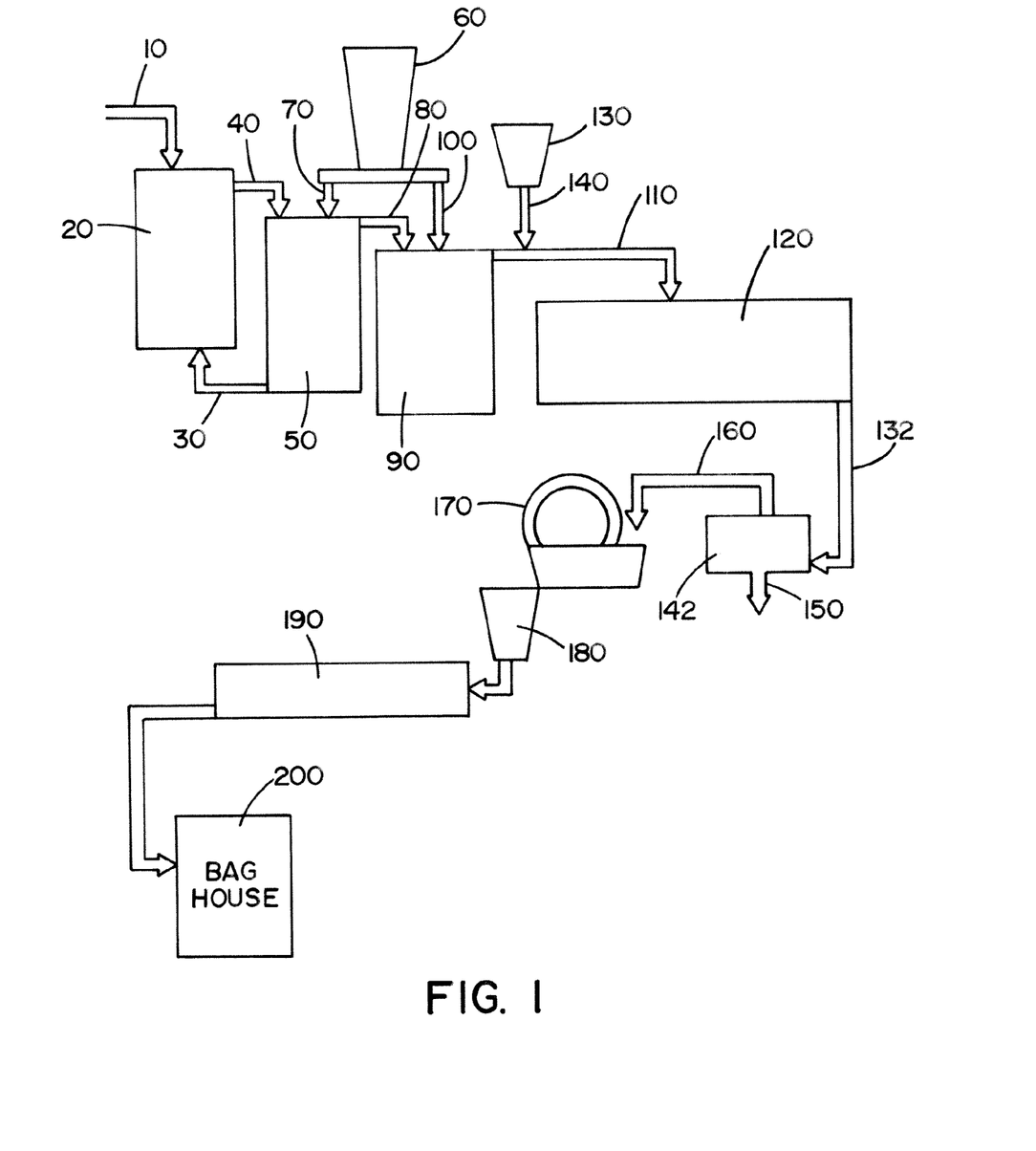
FIG. 1 is a schematic view of a non-limiting process for producing a filler material by precipitation from a dilute aqueous solution containing hydrofluorosilicic acid and hydrochloric acid.

As set forth above, the filler material of the present invention can be formed from precipitation from an aqueous solution containing fluorine containing acid. As set forth in one non-limiting chemical reaction above, the fluorine containing acid can partially or fully include hydrofluorosilicic acid. The fluorine containing acid can also include another acid such as, but not limited to, hydrochloric acid; however, this is not required. A non-limiting method for forming the filler material is set forth as follows and is at least partially formed from by precipitation from a dilute aqueous solution containing hydrofluorosilicic acid and hydrochloric acid. The precipitation is conducted in two-stages by the addition of hydrated lime into two reactor vessels. The filler material formed by the process set forth in FIG. 1 is a composite powder that contains silica-coated calcium fluoride crystal aggregates, amorphous silica particles, and discrete calcium fluoride crystals that are produced by precipitation from a dilute aqueous solution containing hydrofluorosilicic acid. This non-limiting process for forming the filler material is illustrated in FIG. 1.

As illustrated in FIG. 1, the source of fluorine containing acid is typically from a waste stream from another chemical process; however, this is not required. The concentration of the fluorine containing acid in the waste stream is typically low. The concentration of hydrofluorosilicic acid in supply stream 10 that is added to a steady state tank 20 is typically about 0.5-1 weight percent. The pH of supply stream 10 is about 0.5-2, and typically about 1-2. The supply stream also typically includes hydrochloric acid; however, this is not required. The pH in the steady state tank can be homogenized by stirring the content of the tank; however, this is not required. The pH of the steady state tank 20 can be moderated by recycling a portion of the contents of the first reactor tank 50 back into the steady state tank 20 via pipe 30. Fluid from the bottom portion of reactor tank 50 is directed back to steady state tank 20; however, it can be appreciated that fluid from other or additional location in reactor tank 50 can be directed into steady state tank 20. Typically one or more pumps are used to cause fluid to flow from reactor tank 50 to steady state tank 20; however, this is not required. The solid content in the steady state tank is generally about 0-1 weight percent, typically about 0.1-0.6 weight percent, and more typically about 0.2-0.4 weight percent. As can be appreciated, some solids from reactor tank 50 may be introduced into steady state tank 20 via pipe 30.

Pipe 40 directs fluid from a steady state tank 20 into the reactor tank. In the reactor tank, a source of calcium such as calcium oxide and/or calcium hydroxide is added to the reactor tank 50 via supply tube 70 from lime bin 60. The calcium oxide and/or calcium hydroxide typically have an average particle size of less than about 50 microns; however, other particle sizes can be used. A sufficient amount of calcium is added to reactor tank 50 cause the pH in the reactor tank to increase to about 2-4 and typically about 2-3. A slurry is formed in reactor tank 50 which contains the silica-coated fluorspar particles that comprise the basis of this invention. The slurry in the reactor tank contains about 1-3 weight percent solids. The contents in reactor tank 50 are typically stirred to facilitate in the reaction; however, this is not required.

At least a portion of the slurry, formed in reactor tank 50 is directed via pipe 80 into a second reactor tank 90. Additional amounts of calcium oxide and/or calcium hydroxide are added to reactor tank 90 via supply tube 100 from lime bin 60. The slurry from reactor tank 50 is typically taken from the overflow from reactor tank 50; however, it can be appreciated that the slurry can be at least partially taken from other or additional location in reactor tank 50. A sufficient amount of calcium oxide and/or calcium hydroxide is added to the second reactor tank 90 to cause the pH in the second reactor tank to increase to about 6-8 pH. Reactor tank 90 is typically the location where the final pH adjustment for the slurry is obtained; however, this is not required. The solid content of the slurry in reactor tank 90 is generally about 1-4 weight percent, and typically about 1-3 weight percent.

The slurry from reactor tank 90 is fed via pipe 110 into a slurry thickening tank 120. A flocculent agent is added to the slurry. As illustrated in FIG. 1, a flocculent agent is added to pipe 110 via pipe 140 from a flocculent agent source 130. As can be appreciated, the flocculent agent can be partially or directed added into slurry thickening tank 120. One or more polymers are typically used for flocculation of the slurry. One non-limiting example of a flocculent agent that can be used is Drewfloc 2270 manufactured by Crew Chemical Company. The flocculent agent is typically added to the slurry from the reactor tank 90 a rate of about 0.05-0.15 weight percent based on the dry solid content of the slurry. The thickened slurry in slurry thickening tank 120 is allowed to settle in the slurry thickening tank. The solid content of the slurry that settles at or near the bottom of the slurry thickening tank is typically about 15-20 weight percent. The dry solids in the slurry have an average specific surface area of about 70-120 $m^2/g$. Aging of solids can reduce the average specific surface area to about 35-60 $m^2/g$.

The thickened slurry from the slurry thickening tank 120 is typically fed via tube 132 to a hydrocyclone 142; however, this is not required. The hydrocyclone is used to remove oversize particles and/or contaminated particles in the thickened slurry via waste line 150.

After the slurry is processed in the hydrocyclone, the slurry is fed via pipe 160 to a dryer such as a drum filter, cyclonic filter or the like; however, this is not required. As illustrated in FIG. 1, a drum filter 170 to at least partially remove liquid from the slurry to form a filtercake. The filtercake has a solid content of about 30-50 weight percent.

The filtercake that is formed by the drum filter is fed by a cake feeder 180 to a dryer and dried a drier such as by a flash drying method, e.g., a tubular flash dryer or a ring flash dryer 190; however, other or additional driers can be used.

Once the filtercake is dried, the filler material the forms the filtercake is collected in a bag or packaged in a packaging process in bag house 200. The filler material can be screened prior to being bagged or packaged so as to remove undesired sized particles of filler material and/or contaminate; however, this is not required. The bagged or packaged filter material is a powder that contains primarily silica-coated calcium fluoride particles. The filler material is a fine white powder having a Tappi brightness value of about 84-91. The average particle size of the filler material is generally up to about 100 μm, typically about 3-60 μm, and more typically about 4-40 μm.

As set forth above, the filler material can be used as a pigment extender so as to be used as a partial or full substitute for previously used extenders such as calcined diatomaceous earth and/or calcined clay. The pigment extender of the present invention is formulated so as to be used as a partial or full substitute for previously used fillers such as calcium carbonate. The pigment extender of the present invention has been found in some paint formations to reduce the cost of the raw materials of the paint without adversely affecting the properties of the paint. In some formulations, the pigment extender of the present invention increases the hiding power of the paint, reduces the sheen of flat paints, improves the matting properties of the paint.

One novel formulation of the pigment extender is a combination of nepheline syenite and silica coated calcium fluoride. One non-limiting source of nepheline syenite is Minex 3 or Minex 4 offered by Unimin Inc. One non-limiting source of silica coated calcium fluoride is also offered by Unimin Inc. by the name UNI-05-1. The silica coated calcium fluoride generally has an average particle size of no larger than about 170 mesh; however, larger or small particles sizes can be use. The composition of the silica coated calcium fluoride was about 15-25 weight percent silica and about 75-85 weight percent calcium fluoride. The weight ratio of the silica coated calcium fluoride to nepheline syenite is generally about 0.1-1:1. As can be appreciated, other weight ratios can be used. Minex was used to at least partially replace calcium carbonate. The silica coated calcium fluoride was used to at least partially replace Celatom MW-27 and/or calcined clay. The use of Minex 3 and the silica coated calcium fluoride in the paint was found to closely match Celatom MW-27 with regard to paint color, resulting sheen of the paint and the resulting hiding power of the paint.

Several examples of the novel pigment extender of the present invention used in a flat white latex paint is set forth below. In each of these examples, a Dow Ucar emulsion system (vinyl-acrylic emulsion) was used as a standard formulation.

| Grind | Ex. A (lbs./100 Gal.) | Ex. B (lbs./100 Gal.) |
|---|---|---|
| Celite 499 | 34.8/2.0 | 0/0 |
| Colloid 226/25 | 6.0/0.59 | 6.0/0.59 |
| Silica Coated Calcium Fluoride | 0/0 | 53.0/2.0 |
| Drewplus L-475 | 4.0/0.52 | 4.0/0.52 |
| Minex 3 | 131.53/6.05 | 131.53/6.05 |
| Propel GXL | 0.50/0.05 | 0.50/0.05 |
| Propylene Glycol | 10.0/1.16 | 10.0/1.16 |
| Snowflake PE | 175.0/7.75 | 175.0/7.75 |
| Sodium Hydroxide | 3.25/0.26 | 3.25/0.26 |
| Tergitol Np-9 | 2.2/0.25 | 2.2/0.25 |
| Tipure R-902 | 200.0/6.0 | 200.0/6.0 |
| Ucar Polyphobe 102 | 16.0/1.72 | 16.0/1.72 |
| Water | 358.0/43.0 | 358.0/43.0 |
| Let Down | | |
| Drewplus L-475 | 4.0/0.52 | 4.0/0.52 |
| Ucar Filmer IBT | 3.0/0.38 | 3.0/0.38 |
| Ucar Latex 379G | 200.0/22.1 | 200.0/22.1 |
| Ucar Polyphobe 102 | 18.3/1.98 | 18.3/1.98 |
| Water | 50.0/6.01 | 50.0/6.01 |
| Total | 1218.48/100.27 | 1234.24/100.27 |
| Pigment Cost ($/Gal.) | 2.56 | 2.55 |

| Grind | Ex. C (lbs./100 Gal.) | Ex. D (lbs./100 Gal.) |
|---|---|---|
| AMP-95 | 2.0/0.25 | 2.0/0.25 |
| Silica Coated Calcium Fluoride | 56.0/2.11 | 80.0/3.02 |
| Minex 3 | 160.0/7.36 | 183.0/8.42 |
| Optiwhite | 150.0/8.2 | 113.5/6.21 |
| Propylene Glycol | 26.0/3.02 | 26.0/3.02 |
| Rhodoline 643 | 1.5/0.21 | 1.5/0.21 |
| Tamol 1124 | 10.0/1.01 | 10.0/1.01 |
| Tipure R-902 | 110.0/3.3 | 110.0/3.3 |
| Triton X-902 | 2.0/0.23 | 2.0/0.23 |
| Water | 184.0/22.09 | 184.0/22.09 |
| Let Down | | |
| Rhodoline 643 | 2.5/0.34 | 2.5/0.34 |
| Ucar Filmer IBT | 8.0/1.01 | 8.0/1.01 |
| Ucar Latex 379G | 148.0/16.35 | 148.0/16.35 |
| Ucar Polyphobe 102 or 107 | 16.0/2.41 | 16.0/2.41 |
| Water | 267.5/32.11 | 267.5/32.11 |
| Total | 1143.5/99.43 | 1154.2/99.42 |
| Pigment Cost ($/Gal.) | 1.83 | 1.78 |

| Grind | Ex. E (lbs./100 Gal.) | Ex. F (lbs./100 Gal.) |
|---|---|---|

-continued

|  |  |  |
|---|---|---|
| AMP-95 | 2.0/0.25 | 2.0/0.25 |
| Silica Coated Calcium Fluoride | 106.0/4.0 | 136.0/5.13 |
| Minex 3 | 183.0/8.42 | 183.0/8.42 |
| Optiwhite | 96.0/5.25 | 75.0/4.1 |
| Propylene Glycol | 26.0/3.02 | 26.0/3.02 |
| Rhodoline 643 | 1.5/0.21 | 1.5/0.21 |
| Tamol 1124 | 10.0/1.01 | 10.0/1.01 |
| Tipure R-902 | 110.0/3.3 | 110.0/3.3 |
| Triton X-902 | 2.0/0.23 | 2.0/0.23 |
| Water | 184.0/22.09 | 184.0/22.09 |
| Let Down |  |  |
| Rhodoline 643 | 2.5/0.34 | 2.5/0.34 |
| Ucar Filmer IBT | 8.0/1.01 | 8.0/1.01 |
| Ucar Latex 379G | 148.0/16.35 | 148.0/16.35 |
| Ucar Polyphobe 102 or 107 | 16.0/2.41 | 16.0/2.41 |
| Water | 267.5/32.11 | 267.5/32.11 |
| Total | 1162.7/99.44 | 1171.5/99.4 |
| Pigment Cost ($/Gal.) | 1.76 | 1.75 |

Several physical properties of the formulated paints containing the novel pigment extender were compared to the formulated paint that included Celetom MW 27. The results of these comparisons is set forth in Table 1.

TABLE 1

| Test | Ex. 1 | Ex. 2 | Ex. A | Ex. B |
|---|---|---|---|---|
| Hegman Fineness (N.S.) | 1.5 | 2.0 | 2.5+ | 1.0+ |
| pH | 8.0 | 9.2 | ? | 8.5 |
| lbs./Gal. | 11.52 | 12.18 | 12.19 | 12.28 |
| Stormer KU init | 86 | 76 | 77 | 76 |
| ICI, Poise | 0.4 | 2.2 | 2.3 | 2.3 |
| Sag resistance (mils) | 12+ | 12+ | 12+ | 12+ |
| Contrast ratio (3 mils) | 96.6 | 98.4 | 98.5 | 98.7 |
| 85° Sheen (sealed) (6 mils) | 1.4 | 0.9 | 1.2 | 1.2 |
| 85° Sheen (unsealed) (6 mils) | 1.2 | 0.8 | 1.1 | 1.1 |
| Cwf2-Illuminant (Hunter) |  |  |  |  |
| L* | 96.1 | 95.2 | 95.4 | 95.3 |
| a* | −0.8 | −0.8 | −0.8 | −0.75 |
| b* | 3.0 | 2.2 | 2.2 | 2.5 |
| Brightness, Tappi T525 | 89.3 | 88.9 | 89.1 | 88.8 |
| PVC % | 71.4 | 63.1 | 63.1 | 63.1 |
| Test | Ex. C | Ex. D | Ex. E | Ex. F |
| Hegman Fineness (N.S.) | 1.5+ | 1.5 | 1.5 | 1.5 |
| pH | 7.7 | 7.8 | 7.8 | 7.8 |
| lbs./Gal. | 11.52 | 11.59 | 11.69 | 11.72 |
| Stormer (KU) init | 91 | 94 | 95 | 90 |
| ICI, Poise | 0.5 | 0.6 | 0.6 | 0.6 |
| Sag resistance (mils) | 12+ | 12+ | 12+ | 12+ |
| Contrast ratio (3 mils) | 97.4 | 97.3 | 97.4 | 97.1 |
| 85° Sheen (sealed) (6 mils) | 1.7 | 1.2 | 1.1 | 1.1 |
| 85° Sheen (unsealed) (6 mils) | 1.5 | 1.1 | 1.0 | 1.0 |
| Cwf2-Illuminant (Hunter) |  |  |  |  |
| L* | 96.0 | 95.8 | 95.7 | 95.4 |
| a* | −0.7 | −0.7 | −0.7 | −0.6 |
| b* | 3.1 | 3.1 | 3.2 | 3.5 |
| Brightness, Tappi T525 | 89.1 | 88.8 | 88.4 | 87.4 |
| PVC % | 71.4 | 71.4 | 71.4 | 71.4 |

As set forth above, the formulations in Example 1 and Examples C-D illustrate similar paint formulations except for the type of pigment extender that is included in the paint. Likewise, Example 2 and Examples A and B illustrate similar paint formulations except for the type of pigment extender that is included in the paint.

As illustrated in Table 1, the use of the pigment extender of the present invention forms a flat white latex paint that is either comparable or superior to a flat white latex paint that includes the extender Celatom MW 27. The pigment extenders of the present invention all result in a flat white paint having a sheen value at 85° of less than 1.8. Several of the figment extenders of the present invention result in a flat white paint having a sheen value of about 1-1.2. The sheen of the paint samples was tested after a two day drying period. Six mil coatings were used to test the sheen, color, gloss and brightness of each paint sample. Low sheen is desirable by painters to hide imperfections on the substrate surface. The pigment extenders of the present invention can be successfully used to reduce the sheen value of paints.

The pigment extender of the present invention not only can function as a flatting agent to reduce the sheen of the paint, the use of the pigment extender resulted in a paint having equivalent or superior hiding power as compared to a paint that included Celatom MW 27. The pigment extender of the present invention also resulted in a high contrast ratio for the paint. The contrast ratio was determined by measuring the light reflected over a white surface versus the amount of light reflected over a black surface multiplied by 100. The higher the reflectance over a black surface, the greater the contrast ratio or hiding power of the paint. The contrast ratio for each paint sample was measured after a two day drying period. A paint thickness of three mils was used for each contrast ratio test.

The cost of using the pigment extender for each sample was either comparable or less expensive than to a paint that included Celatom MW 27.

The pigment extenders illustrated in Examples C and D were shown to function as a partial substitute for Duramite (calcium carbonate). The pigment extenders illustrated in Examples E-H were shown to function as a full substitute for Duramite (calcium carbonate) and a partial substitute for Optowhite (calcined clay). As such, the pigment extender of the present invention exhibited properties not only related to hiding power, the pigment extender also exhibited properties relating to a paint filler and a matting agent. The versatility of the pigment extender of the present invention thereby resulted in less need for more expensive components thereby reducing the cost of raw materials to form the paint.

The test results of the paint formulations revealed that silica coated calcium fluoride can be used as both a flatting agent and an extender. The silica coated calcium fluoride was found to increase the Stormer and ICI viscosity of the paint due to the high oil absorption properties of the silica coated calcium fluoride. The silica coated calcium fluoride was thus found to be a good full or partial substitute for calcined clay (an extender) without loss in the contrast ratio of the paint. Indeed in several paint formulations, the silica coated calcium fluoride increased the contrast ratio of the paint. The silica coated calcium fluoride was found to cause the L* and brightness of the paint to diminish only slightly when the content of the silica coated calcium fluoride exceeded about 3.0 gallons. The test results revealed that the best balance for matting efficiency, cost, and color was a pigment extender that included about 160-190 lbs. Minex 3 and about 70-90 lbs. silica coated calcium fluoride. This formulation of the pigment extender provided a good substitute for Celatom MW-27 in the paint. As can be appreciated, for different paint formulations, the best balance for Minex 3 and silica coated calcium fluoride in the paint may vary.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. A method for forming a paint having improved hiding power and low sheen comprising:
   a) providing a latex paint;
   b) adding a pigment and a pigment extender to said latex paint, said pigment extender including a metal fluoride particle, said metal fluoride particle includes a composition of about 0.1-50 weight percent silica and about 50-99.9 weight percent metal fluoride.

2. The method as defined in claim 1, wherein said metal fluoride particle includes a silica coated metal fluoride.

3. The method as defined in claim 2, wherein said paint includes nepheline syenite, a weight ratio of metal fluoride particle to nepheline syenite is about 0.2-0.8:1.

4. The method as defined in claim 3, wherein said metal fluoride particle includes calcium fluoride.

5. The method as defined in claim 2, wherein said metal fluoride particle includes calcium fluoride.

6. The method as defined in claim 1, wherein said paint includes nepheline syenite, a weight ratio of metal fluoride particle to nepheline syenite is about 0.2-0.8:1.

7. The method as defined in claim 1, wherein said metal fluoride particle includes particles having a composition of about 60-80 weight percent metal fluoride and 20-40 weight percent silica.

8. The method as defined in claim 7, wherein said metal fluoride particle has an average particle size of no greater than about 170 mesh.

9. The method as defined in claim 8, wherein said latex paint includes a polymer having interpolymerized units that comprise units derived from styrene, methyl styrene, vinyl, or combinations thereof and units derived from one or more acrylates, methacrylates, acrylonitrile, and combinations thereof.

10. The method as defined in claim 9, wherein said pigment includes titanium dioxide.

11. The method as defined in claim 10, wherein said paint has an 85 sheen value of less than about 2.

12. The method as defined in claim 11, wherein said metal fluoride particle is white and has a Tappi brightness value of about 84-91.

13. The method as defined in claim 12, wherein said metal fluoride particle has average specific surface area of about 70-120 $m^2/g$.

14. The method as defined in claim 13, wherein a weight ratio of pigment extender to pigment in said paint is about 0.1-4:1.

15. The method as defined in claim 1, wherein said metal fluoride particle has an average particle size of no greater than about 170 mesh.

16. The method as defined in claim 1, wherein said latex paint includes a polymer having interpolymerized units that comprise units derived from styrene, methyl styrene, vinyl, or combinations thereof and units derived from one or more acrylates, methacrylates, acrylonitrile, and combinations thereof.

17. The method as defined in claim 1, wherein said pigment includes titanium dioxide.

18. The method as defined in claim 1, wherein said paint has an 85 sheen value of less than about 2.

19. The method as defined in claim 1, wherein said metal fluoride particle is white and has a Tappi brightness value of about 84-91.

20. The method as defined in claim 1, wherein said metal fluoride particle has average specific surface area of about 70-120 $m^2/g$.

21. The method as defined in claim 1, wherein a weight ratio of pigment extender to pigment in said paint is about 0.1-4:1.

* * * * *